Figure 2:
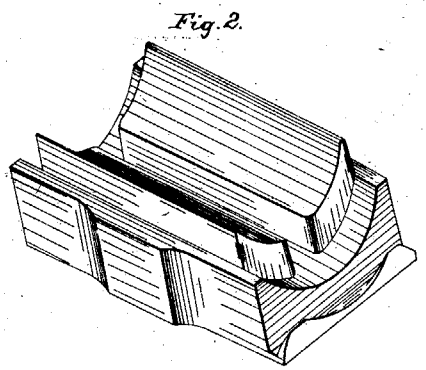

P. S. Derlan.

Journal Box,

No. 31,208. Reissued July 9, 1861.

UNITED STATES PATENT OFFICE.

PATRICK S. DEVLAN, OF ELIZABETHPORT, NEW JERSEY.

IMPROVEMENT IN JOURNAL-BOXES.

Specification forming part of Letters Patent No. 30,128, dated September 25, 1860; Reissue No. 1,208, dated July 9, 1861.

DIVISION A.

*To all whom it may concern:*

Be it known that I, PATRICK S. DEVLAN, of Elizabethport, in the county of Union and State of New Jersey, have invented an Improvement in Journal-Boxes, of which the following is a specification.

My invention relates to a novel kind of bearing or box for all sorts of journals or axles to run in, and has for its objects the production of boxes and bearings of all kinds from fibrous matter, as a substitute for the various metals, alloys, and wood now employed, and at an exceedingly reduced cost, and possessing great practical utility and advantage over all materials or compositions heretofore used for the said purpose.

Previous to my invention boxes for the journals of car and other axles and bearings for all sorts of shafts in the various branches of machinery have been made of metal and alloys—such as brass, babbitt metal, &c.—different metals being selected for different boxes, according to the size of the journals to be run in them, the material of which the journal was to be, and the velocity at which it was to run, upon rules of practice well known to the experienced mechanic. I have discovered that paper-pulp, or any vegetable fibrous matter reduced to a pulp, when solidified by pressure will form a most excellent bearing-surface for boxes of all sorts of journals and shafts; and my invention consists of forming the bearing-surfaces of journal-boxes of any vegetable fibrous pulp compressed into a solid condition, as will be hereinafter fully explained.

To enable those skilled in the art to make and use my invention, I will describe the method in which I have successfully put the same into practice.

I take the pulp, prepared in the usual way for making paper, or take old paper and reduce it to a pulp, or make a pulp of any vegetable fibrous material by any suitable process of pulping. From this pulp I extract so much of the water as to leave it sufficiently moist only to be plastic. I then fill this moist pulp into the box of which it is to form the bearing-surface, leaving a given quantity projecting over and above the quantity required to fill the space to be occupied by the pulp, and in this condition place the box with its overcharge of bearing composition in a suitable place to dry, (it may be dried by artificial heat if deemed expedient.) When all the moisture has been evaporated or extracted from the pulp, I then place the box and its contents in a press, and placing a former (of the exact size of the journal which is to run in the box) on the dried pulp, force it into the box, making the whole (over) charge occupy the space allotted within the box. The method just described of forming the bearings will be perfectly comprehended by reference to the accompanying drawings, forming part of this specification.

Figure 4:
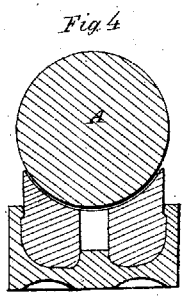
Figure 3:
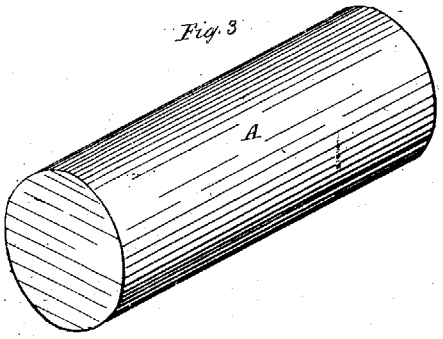
Figure 1:
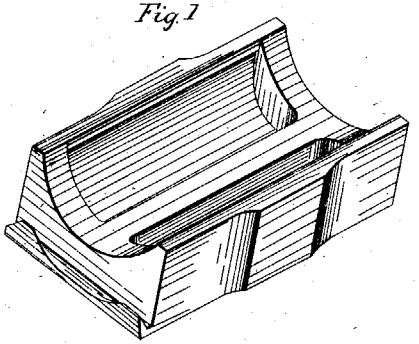

At Figure 1 is shown a box or shell such as used on a car-axle. At Fig. 2 the said box is shown filled with a charge of the pulp which has been dried and is ready for the press. Fig. 3 is a perspective view of a former, which must be of exactly the same diameter as the journal which is to run in the box. Fig. 4 is a sectional view of box and its charge of bearing composition or material, with former A in position to be pressed. In this condition the whole is submitted to a heavy pressure, and the former is forced into position seen at Fig. 5, whereby the whole mass of bearing material is compressed into the box or shell and its bearing-surface perfectly shaped or molded to fit the journal which is to run in it.

Figure 5:
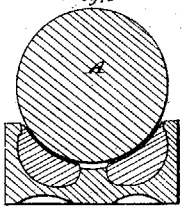

In preparing a box of the size shown in the the accompanying drawings, I should put in a sufficient quantity of the moist pulp to project over or above its intended limits about three-quarters of an inch, (I have not observed any shrinkage in drying,) and apply a pressure severe enough to force or pack the whole quantity within the box, as shown at Fig. 5. The degree of compactness of the material or amount of pressure to which it is submitted in filling the boxes does not, however, constitute any portion of my invention, and may be varied as circumstances and experience may suggest or require. I have found by a practical and thorough test of my invention that a box or bearing made of paper-pulp, as hereinbefore described, will cause less friction on the journal running in it than a bearing-surface of any metal or material heretofore employed; that it will be less liable to heat, and will last longer than any of the materials now used, while it requires no fitting after it is molded, and costs infinitely less than any bearing-surface heretofore used or known.

I wish it to be distinctly understood that I do not limit my invention to any particular vegetable pulp, nor to any particular method of forming or filling the boxes.

I have described the method I have employed in making boxes for car and locomotive axles, but this forms no part of my invention.

What I claim as my invention, and desire to secure by Letters Patent, is—

The employment of paper-pulp or pulp made of any vegetable fibrous material to form the bearing-surface of journal-boxes, substantially as hereinbefore set forth.

In testimony whereof I have hereunto set my hand this 27th day of March, 1861.

Witnesses: P. S. DEVLAN.

WM. C. MCINTIRE,

PETER DEVINE.